United States Patent
Buben et al.

[11] 3,758,673
[45] Sept. 11, 1973

[54] PROCESS FOR THE PRODUCTION OF A CARBON MONOXIDE CONTAINING GAS

[75] Inventors: David Buben; Clyde L. Aldridge, both of Baton Rouge, La.

[73] Assignee: Esso Research and Engineering Company, Linden, N.J.

[22] Filed: Mar. 18, 1971

[21] Appl. No.: 125,582

[52] U.S. Cl............... 423/415, 423/656, 252/441, 252/443
[51] Int. Cl...... C01b 31/18, C01b 1/08, C01b 1/02
[58] Field of Search.................. 23/204, 213, 210; 423/415, 439

[56] References Cited
UNITED STATES PATENTS

| | | |
|---|---|---|
| 2,921,840 | 1/1960 | Johnson et al.................. 23/204 M |
| 3,385,668 | 5/1968 | Schunemann.................... 23/204 M |
| 3,539,297 | 11/1970 | Aldridge............................. 23/213 |
| 3,615,216 | 10/1971 | Aldridge............................. 23/213 |

*Primary Examiner*—Edward Stern
*Attorney*—Pearlman & Schlager and Llewellyn A. Proctor

[57] ABSTRACT

A process for producing carbon monoxide and hydrogen which comprises contacting a carbon dioxide containing gas with a carbonaceous material in the presence of a cesium salt catalyst in a reaction zone operating at temperatures below 1,600° F.

5 Claims, 1 Drawing Figure

Patented Sept. 11, 1973
3,758,673
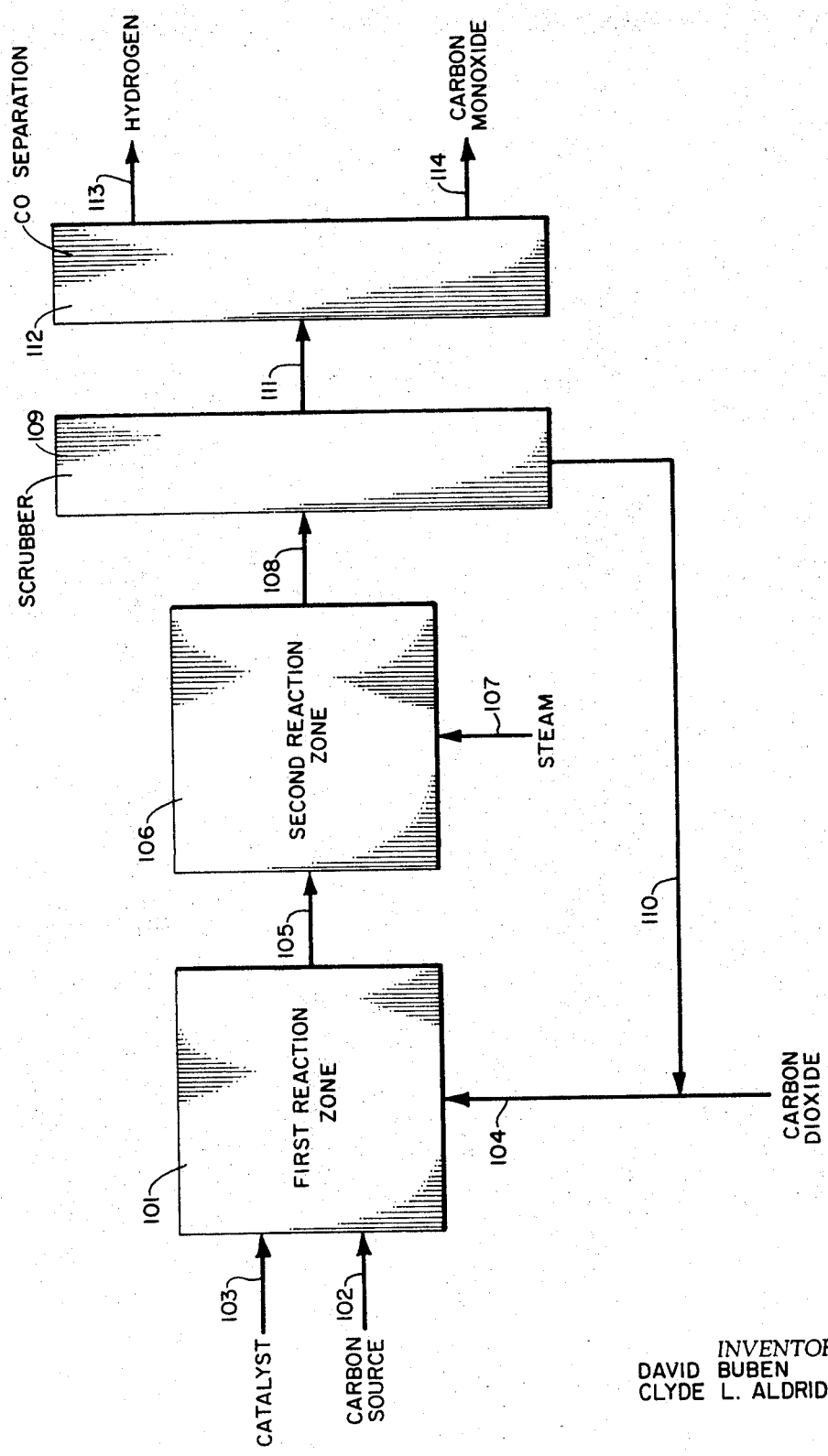
INVENTORS
DAVID BUBEN
CLYDE L. ALDRIDGE

PROCESS FOR THE PRODUCTION OF A CARBON MONOXIDE CONTAINING GAS

BACKGROUND OF THE INVENTION

This invention relates to the production of carbon monoxide and hydrogen. More particularly it relates to the production of carbon monoxide by a process where carbon dioxide is contacted with carbon in the presence of a catalyst composition in a reaction zone operated at a temperature less than 1,600° F.

In another aspect this invention relates to the production of synthesis gas. More particularly, the carbon monoxide produced in a first reaction zone by reacting carbon dioxide with carbon in the presence of a catalyst is introduced, along with steam, into a second reaction zone so as to contact a water gas shift reaction catalyst to produce a hydrogen containing gas.

It has been known that carbon monoxide could be produced by reacting carbon dioxide with a carbonaceous material according to the following reaction:

$$C + CO_2 = 2CO$$

However, this process must be carried out under extreme conditions. In order that these conditions, particularly temperature, could be reduced various catalysts have been employed. Although the above reaction in the presence of certain catalysts could proceed at temperatures about 1,000° F., it was not until temperatures of about 2,000° F. were reached in the reaction zone that high enough rates of conversion of carbon and $CO_2$ conversion to carbon monoxide were obtained for the process to become economically feasible. However, to maintain the reaction zone at such extreme temperatures requires a large heat input which is very expensive. Furthermore, such extreme temperatures result in engineering problems in the construction of reaction vessels used in this process. As a result such vessels are very expensive capital expenditures.

As it would be desirable to have lower cost carbon monoxide to use in other petroleum processes such as the production of hydrogen by reacting steam with carbon monoxide, it is accordingly an object of this invention to provide a process for more economically producing carbon monoxide.

A further object of this invention is to produce carbon monoxide by reaction of carbon dioxide and carbon at temperatures much less than 2,000° F.

Another object of this invention is to provide an improved carbon-carbon dioxide reaction catalyst.

These and other objects will become apparent from the ensuing description of the invention.

SUMMARY OF THE INVENTION

Carbon monoxide is produced in a reaction zone operating at temperatures between 1,000° and 1,600° F., preferably between 1,400° and 1,600° F., and at pressures between 0 and 1,000 psig by passing carbon dioxide through a carbonaceous material, preferably petroleum coke, at a rate between 0.1 and 10.0 moles $CO_2$/mole C/Hr., preferably between 0.1 and 4.0 moles $CO_2$/mole C/Hr., in the presence of an alkali salt catalyst, preferably cesium carbonate, or molten alkali salt melts comprising $Cs_2CO_3$.

In another embodiment of this invention a hydrogen-containing gas is produced by utilizing the carbon monoxide produced by the above process and contacting it with steam in a separate reaction zone operated at a temperature between 300° and 900° F. and a pressure between 0 and 1,000 psig and which also contains a water gas shift catalyst.

BRIEF DESCRIPTION OF THE DRAWING

The FIGURE schematically illustrates the preferred embodiment of this invention.

PREFERRED EMBODIMENT OF THIS INVENTION

As stated above a critical need in today's refinery processes is the need for an economical source of hydrogen. It is known that carbon reacts with carbon dioxide to produce carbon monoxide $$C + CO_2 = 2CO,$$

and that carbon monoxide can be treated with steam to produce hydrogen and carbon dioxide $$CO + H_2O = CO_2 + H_2.$$

The hydrogen so produced could be recovered and used in other refinery processes such as hydrofining, etc. The carbon dioxide could be then recycled over a carbon containing material to produce more carbon monoxide. Such a process appears even more attractive since there exist in refinery operations certain materials such as high sulfur petroleum coke, etc. which have little economic value as products, but which have high carbon contents. Thus a cheap source of carbon is readily available.

However, until now such a process was not economically attractive since the reaction $$C + CO_2 = 2CO$$

could not be carried out and produce sufficient quantities of carbon monoxide to be economically attractive unless reaction temperatures of about 2,000° F. could be used.

According to this invention $CO_2$ is passed through a carbonaceous material such as petroleum coke, charcoal, graphite, coal char, or any other solid carbon-containing material, but preferably petroleum coke, in the presence of a cesium salt catalyst, all of which are in a reaction zone.

Although any heavy carbonaceous material may be used the preferred embodiment will be described using petroleum coke.

Petroleum coke is introduced through line 102 into reaction zone 101 which is operating at a temperature between 1,000° and 1,600° F., preferably between 1,400° and 1,600° F., and at a pressure between 0 and 1,000 psig. The temperature can be maintained either by preheating the petroleum coke before it is placed into the reaction zone or it may be heated by electrical or other means once it is in the reaction zone.

A cesium salt catalyst, preferably cesium carbonate, is also introduced through line 103 into reaction zone 101. This catalyst could comprise cesium formate, cesium acetate, or any other cesium salt that will decompose into cesium carbonate when in the presence of CO or $CO_2$ at temperatures between 1,000° and 1,600° F. The preferred catalyst is cesium carbonate since the highest carbon-carbon dioxide conversion rates at lower temperatures are obtained with this catalyst. Of course, the catalyst could be comprised of mixtures of the different cesium salts described above, or it could also be comprised principally of cesium carbonate and lesser weight amounts of other alkali metal salts such as $Li_2CO_3$ and CsCl. When using certain alkali metal salts in combination with $Cs_2CO_3$, such as $Li_2CO_3$ and CsCl, these mixtures are maintained as a molten salt melt and the $Li_2CO_3$ and CsCl are used in amounts between 40 and 60 mole percent based on the total catalyst weight because the use of a melt aids in the catalyst recovery, results in more efficient heat transfer from the catalyst to the feed, and makes possible lower operating temperatures in the reaction zone.

The amount of catalyst needed in the reaction zone is dependent primarily upon the operating conditions of the reaction zone. Generally a catalyst content of between 10 and 1,000 weight percent based on the amount of carbon will give satisfactory carbon conversion rates.

Carbon dioxide is then introduced through line 104 into reaction zone 101 so as to contact the petroleum coke in the presence of the cesium salt catalyst. The carbon dioxide is introduced into the reaction zone at a rate dependent on the amount of carbon in the zone. Rates of 0.1 to 10.0 moles $CO_2$/mole C/Hr., preferably 0.1 to 4.0 moles $CO_2$/mole C/Hr., and most preferably 0.1 to 1.0 moles $CO_2$/mole C/Hr., will give excellent carbon-carbon dioxide conversion rates.

If it is desired to produce more hydrogen for use in other refinery processes the carbon monoxide produced in reaction zone 101 under the above described conditions can be removed from reaction zone 101 by line 105 and introduced into second reaction zone 106 containing a water gas shift catalyst so as to react with steam introduced through line 107.

Suitable shift catalysts include iron or copper on an alumina support, copper-zinc oxide, and the like. When such catalysts are used the reaction in zone 106 may be carried out at temperatures between 300° and 900° F., and pressures between 0 and 1,000 psig. Under these conditions steam will be introduced in amounts greater than the CO present.

The gaseous products from reaction zone 106 are removed from said zone by line 108 and introduced into a scrubber reactor 109 where steam and carbon dioxide are removed. The $CO_2$ can be recycled after removal of steam by conventional means not shown to the first reaction zone by line 110 and 104.

There are many known processes for removal of steam and carbon dioxide from hydrogen containing gases. The steam may be condensed and removed while the carbon dioxide may be removed by many processes such as the standard water scrubbing process, use of ethanolamines, use of hot potassium carbonate as a scrubbing agent, Fluor solvent process (U.S. Pat. No. 2,926,751), Giammarco-Vetrocoke hot carbonate process (Italian Pat. No. 470,758), or the Catacarb process [A. G. Eickmeyer, *Chemical Engineering Progress*, 58(4), pp. 89–91, (1962)].

The hydrogen and carbon monoxide are taken from the scrubber reactor 109 by line 111 and introduced to a typical carbon monoxide separator vessel 112 wherein the hydrogen gas is separated from the carbon monoxide and removed by lines 113 and 114 respectively. Typical of such carbon monoxide separation processes would be either the copper-liquor scrubbing process or the low temperature separation as described in volume 4 of Kirk-Othmer Encyclopedia of Chemical Technology at pages 438–440. The hydrogen so recovered may then be sent to the desired petroleum processing operation and the carbon monoxide may be recycled to the second reaction zone 106. Alternatively the residual carbon monoxide could be removed from the hydrogen by conventional methanization.

The following examples are provided to illustrate the process as above described and to demonstrate the superiority of this process over other known processes.

Example I illustrates the most preferred aspect of this invention. Example II illustrates the results obtained when using other carbonaceous material than coke, and at different operating conditions.

EXAMPLE I

Fluid petroleum coke which had the following composition:

| | |
|---|---|
| Weight % Carbon | 86.75 |
| Weight % Hydrogen | 2.02 |
| Weight % Sulfur | 6.39 |
| Weight % Nitrogen | 1.49 |
| Weight % Oxygen | 3.30 |
| Weight % Vanadium | 0.05 |
| Surface Area ($M^2$/g.) | 11.0 |
| Pore Volume (Ml./g.) | 0.0 | was introduced into a reaction zone operating at 1,500° F. and at atmospheric pressure. Cesium carbonate in a quantity of 24 weight percent based on the weight of the coke was also introduced into the reaction zone. Carbon dioxide was then fed into the reaction zone at a rate of 0.2–0.3 moles $CO_2$/mole carbon/Hr. The gas given off was then collected and analyzed for CO content. This same procedure was repeated except that no catalyst was placed in the reaction zone. The results are given below.

| | Carbon Conversion Rate (%/Hr.) | Carbon Dioxide Conversion (%) |
|---|---|---|
| Uncatalyzed | 1.1 | 3.4 |
| $Cs_2CO_3$ Catalyst | 14.1 | 63.7 |

This dramatically illustrates the effect of adding a $Cs_2CO_3$ catalyst to the reaction zone. It is seen that the reaction rate is enhanced by 10–20 fold both as measured by carbon conversion rate and degree of carbon dioxide conversion.

EXAMPLE II

The same procedure as in Example I was repeated except the temperature, pressure, $CO_2$ gas rate, and feed were varied. In some cases, activated coconut charcoal was used as the feed. Activated coconut charcoal (20–70 mesh) refers to a carbonaceous material comprised of the following components:

| | |
|---|---|
| Weight % Carbon | 89.80 |
| Weight % Hydrogen | 0.52 |
| Weight % Sulfur | 0.10 |
| Weight % Nitrogen | ~0.00 |
| Weight % Oxygen | 9.58 |
| Weight % Vanadium | ~0.00 |
| Surface Area ($M^2$/g.) | 1195 |
| Pore Volume (Ml./g.) | 0.75 |

The results of these runs follow.

| Run Number | Carbon[1] material | Reaction temperature (° F.) | Reaction pressure (p.s.i.g.) | CO2 gas rate (mole CO2/ mole C/hr.) | Amount of Cs2CO3 (wt. percent on feed) | Carbon conversion (percent/ hr.) | CO2 conversion (percent at max. carbon conversion) | CO production rate (moles CO/mole C/hr.) |
|---|---|---|---|---|---|---|---|---|
| 1 | FPC | 1,000 | 0 | 3.71 | 100 | 2.28 | 0.77 | 0.057 |
| 2 | FPC | 1,000 | 650 | 3.71 | 100 | 0.64 | 0.21 | 0.016 |
| 3 | ACC | 1,000 | 650 | 3.71 | 100 | 2.20 | 0.71 | 0.053 |
| 4 | FPC | 1,400 | 0 | 1.24 | None | 0.90 | 0.71 | 0.018 |
| 5 | FPC | 1,400 | 0 | 1.02 | 24 | 26.60 | 25.20 | 0.515 |
| 6 | ACC | 1,400 | 0 | 1.03 | None | 2.82 | 2.53 | 0.052 |
| 7 | ACC | 1,400 | 0 | 1.00 | 24 | 35.80 | 35.1 | 0.702 |
| 8 | FPC | 1,500 | 0 | 0.30 | None | 1.08 | 3.4 | 0.020 |
| 9 | FPC | 1,500 | 0 | 0.22 | 24 | 12.40 | 56.7 | 0.249 |
| 10 | FPC | 1,500 | 0 | 0.044 | 24 | 3.48 | 83.8 | 0.0738 |
| 11 | FPC | 1,500 | 0 | 0.24 | 24 | 14.10 | 63.7 | 0.306 |
| 12 | FPC | 1,500 | 0 | 0.56 | 24 | 33.7 | 40.5 | 0.454 |
| 13 | FPC | 1,500 | 0 | 1.93 | 24 | 51.5 | 26.7 | 1.03 |

[1] FPC=fluid petroleum coke; ACC=Activated coconut charcoal.

From the above data, it is seen that the preferred operating temperatures are above 1,400° F. and most preferably around 1,500° F.

We claim:

1. A process for the production of a carbon monoxide-containing gas from a carbonaceous material, which comprises:
contacting a carbon dioxide-containing gas with a carbonaceous material at a rate between 0.1 and 10 moles $CO_2$ per mole C per hour in the presence of a catalyst composition comprising a molten mixture of cesium carbonate with lithium carbonate or cesium chloride, wherein the lithium carbonate or the cesium chloride comprises from about 40 to about 60 mole percent of the total weight of said catalyst composition, in a reaction zone maintained at a temperature between about 1,000° and about 1,600° F. and at a pressure between about 0 and 1,000 psig.

2. A process for the production of a carbon monoxide-containing gas from a carbonaceous material, which comrises:
contacting carbon dioxide with a carbonaceous material at a rate between 0.1 and 10 moles $CO_2$ per mole C per hour in the presence of a catalyst composition comprising a molten mixture of cesium carbonate with lithium carbonate or cesium chloride, wherein the lithium carbonate or the cesium chloride comprises about 40 to about 60 mole percent of the total weight of said catalyst composition, in a reaction zone maintained at a temperature between about 1,400° and 1,600° F. and at a pressure between about 0 and 650 psig.

3. The process of claim 2, wherein said carbon dioxide is introduced into said reaction zone at a rate of 0.1 to 4 moles $CO_2$ per mole C per hour.

4. The process of claim 2, wherein said carbon dioxide is introduced into said reaction zone at a rate of 0.1 to 1 mole $CO_2$ per mole C per hour.

5. The process of claim 2, wherein said carbonaceous material is petroleum coke.

* * * * *